United States Patent [19]

Wright

[11] Patent Number: 5,090,514

[45] Date of Patent: Feb. 25, 1992

[54] SAFETY DEVICE OPERABLE BY A PASSENGER OF A MOTOR VEHICLE

[76] Inventor: Harry D. Wright, Rte. 2, Box 200, New Roads, La. 70760

[21] Appl. No.: 580,165

[22] Filed: Sep. 10, 1990

[51] Int. Cl.$^5$ .......................................... B60K 28/00
[52] U.S. Cl. ................................... 180/271; 180/325; 180/333
[58] Field of Search .............. 180/325, 271, 272, 275, 180/279, 286, 315, 321, 333, 335

[56] References Cited

U.S. PATENT DOCUMENTS

| | | | |
|---|---|---|---|
| 659,121 | 10/1900 | Ayres | 180/325 |
| 918,680 | 4/1909 | Krause | 180/325 |
| 979,938 | 12/1910 | Eiselt | 180/325 X |
| 1,013,473 | 1/1912 | Block | 180/325 |
| 1,087,485 | 2/1914 | Favary | 180/325 |
| 1,230,715 | 6/1917 | Johnson | 180/315 |
| 1,282,389 | 10/1918 | Dodge | 180/330 |
| 1,337,008 | 4/1920 | Fend | 180/325 |
| 1,650,272 | 11/1927 | Hartmann | 180/271 |
| 2,946,485 | 7/1960 | Durner | 180/271 X |
| 3,186,508 | 6/1965 | Lamont | 180/272 |
| 4,234,051 | 11/1980 | Morris et al. | 180/272 |

Primary Examiner—Charles A. Marmor
Assistant Examiner—Kevin Hurley
Attorney, Agent, or Firm—David L. Ray

[57] ABSTRACT

A safety device for an automobile including an electrical switch operable by a passenger in an automobile, the switch having a closed position and an open position, the switch having an engine control circuit for stopping the automobile engine, a brake circuit for applying the brakes of an automobile to stop the automobile, and an emergency flasher light actuating circuit for activating the emergency flashing lights of an automobile when the switch is closed.

3 Claims, 1 Drawing Sheet

SAFETY DEVICE OPERABLE BY A PASSENGER OF A MOTOR VEHICLE

BACKGROUND OF THE INVENTION

1. Field of the Invention

The present invention relates to a safety device for a motor vehicle. More particularly, the present invention relates to a safety device operable by a passenger in a motor vehicle. Even more particularly, the present invention relates to a safety device operable by a passenger in a motor vehicle which allows the passenger to safely stop a vehicle when the driver of the vehicle is impaired or incapacitated.

2. Description of the Prior Art

Safety devices for stopping automobiles are known in the art. Exemplary of the prior art are the following U.S. Patents:

U.S. Pat. No. 659,121 discloses an appliance for automobiles in which a passenger can shut off fuel to the engine or shut off the ignition system to stop the automobile. The fuel flow is stopped by turning a lever, valve or handle.

U.S. Pat. No. 918,680 discloses a emergency stop for motor vehicles including an auxiliary brake lever normally out of use, but serving not only to apply the emergency brakes but also to break the circuit to the ignition system of the engine and thus stop the engine. The emergency lever can be located in the front seat or the back seat of an automobile or by both seats for operation by passengers in the automobile.

U.S. Pat. No. 979,938 discloses an automatic emergency brake for automobiles including a automatic emergency brake operated by compressed air and an emergency valve operated by a handle and preferably located on the dash board of the car for interrupting the ignition system of the automobile engine. The automatic emergency brake and ignition interrupting system can be operated by either the driver of the automobile or by one of the occupants.

U.S. Pat. No. 1,013,473 discloses a vehicle brake including a brake which can be operated by a passenger by pulling a lever to stop the vehicle, should the driver of the vehicle fail to do so or become incapacitated.

U.S. Pat. No. 1,087,485 discloses a safety device for automobiles including a device controllable independently of the chauffeur for bringing the automobile to a stand still in case of emergency. The device for stopping the automobile includes a device for advancing the timing of the ignition spark so that the spark begins to occur at the beginning of the compression stroke, thereby stopping the engine at a point whereby the compression of the gas in the cylinders will offer considerable resistance to the movement of the pistons, which will result in bringing automobile quickly to a stand still.

U.S. Pat. No. 1,337,008 discloses a device for preventing the application of motor driving power such as electric current to the drive motor of the automobile while the brakes are set.

U.S. Pat. No. 1,230,715 discloses a motor vehicle which is capable of being steered from an invisible position within the body of the car and is further provided with a dummy steering and controlling apparatus in the customary place whereby an illusion is created that the car when in motion is under no one's control. The car is useful in motor pictures, parades, stage productions and the like.

U.S. Pat. No. 1,282,389 discloses an electric automobile control wherein an electric automobile can be controlled either from the front or rear seat. Brakes can be actuated independently of each other or simultaneously from either the front or the rear seat.

U.S. Pat. No. 1,650,272 discloses a motor vehicle having an emergency device controlled from the rear compartment of the vehicle to enable the passenger in case of emergency to shut off the motor and bring the vehicle to a stop. The passenger can operate a switch which will interrupt the ignition system of the automobile and apply the brakes.

U.S. Pat. No. 2,946,485 discloses a safety brake setting device for vehicles for use on delivery motor vehicles which must be frequently left unattended. The device disclosed insures adequate setting of the brakes of the vehicle in response to metered delivery of the substance carried by the vehicle. The device operates in combination with a meter installed on the vehicle for metering of a substance delivered by the vehicle and actuates brakes by the use of a servo motor, a vacuum line leading to the motor, and a valve for controlling the line, the valve being operated in response to the meter.

SUMMARY OF THE INVENTION

It is an object of the present invention to provide a safety device operable by the passenger in an automobile whereby the passenger can stop the automobile engine, set the brakes on the automobile and turn on the emergency flasher lights.

In accordance with the present invention there is provided a safety device for an automobile including an electrical switch operable by a passenger in an automobile, the switch having a closed position and an open position, the switch having an engine control circuit for stopping the automobile engine, a brake circuit for applying the brakes of an automobile to stop the automobile, and an emergency flasher light actuating circuit for activating the emergency flashing lights of an automobile when the switch is closed.

In most limousines and other automobiles on highways throughout the world, the passenger has no means to control the automobile if the driver is physically or mentally incapacitated while driving the automobile. The present invention permits the passenger to stop the automobile and warn others by activating the emergency flasher lights. It is extremely important to actuate the emergency flasher lights to warn and prevent other vehicles from colliding with the automobile after an emergency stop initiated by the passenger.

BRIEF DESCRIPTION OF THE DRAWING

The invention will be more clearly understood by reference to the drawing in which there is shown a schematic representation of an automobile having a driver and a passenger, and circuitry for actuating the braking system, stopping the engine, and turning on the emergency flasher lights.

DESCRIPTION OF THE PREFERRED EMBODIMENTS

Figure 1:
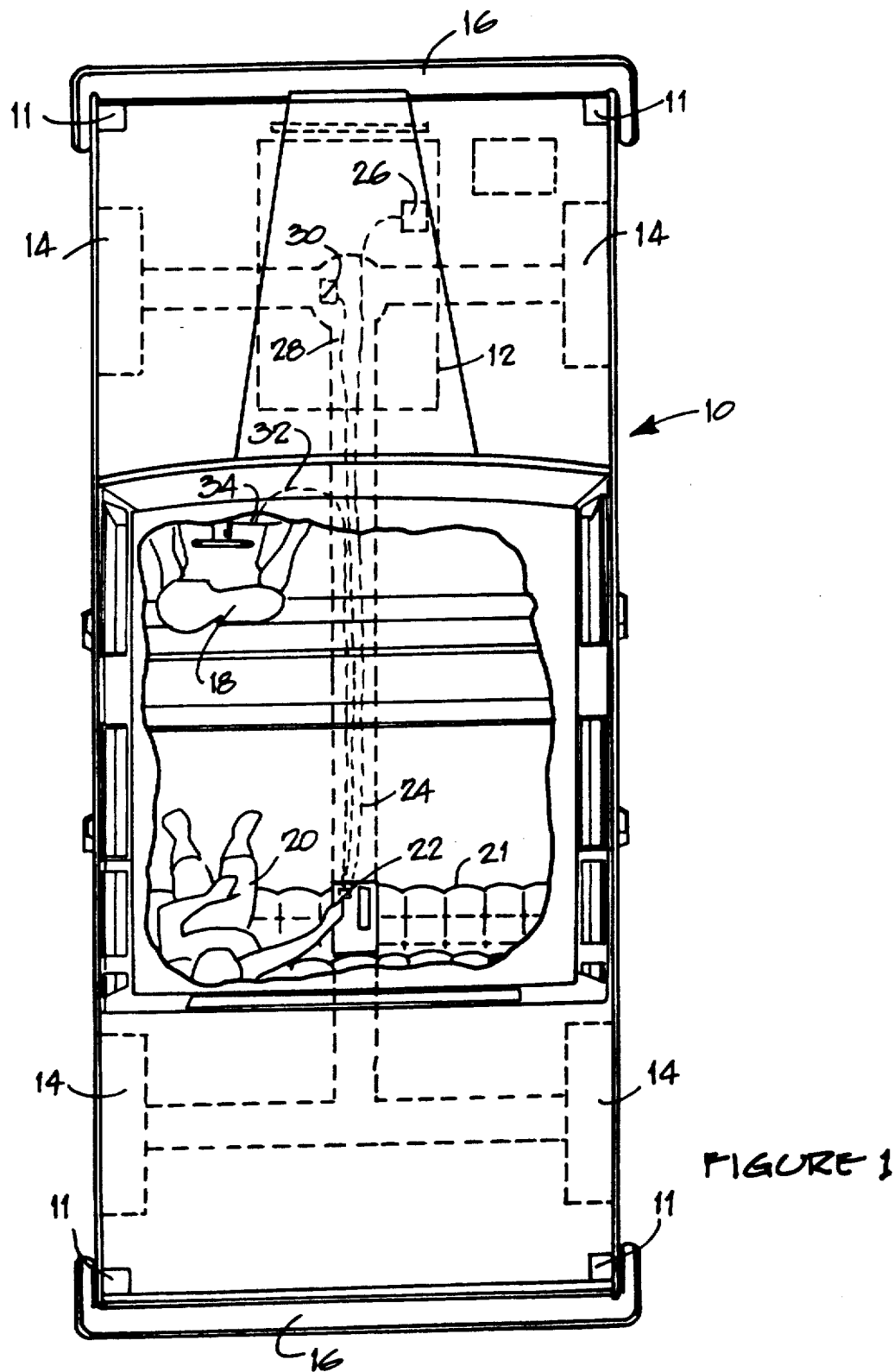

Referring now to the drawing, an automobile is generally indicated by the numeral 10. Automobile 10 has an engine 12, tires 14, and bumpers 16. Conventional emergency flasher or warning lights 11 are located at the front and rear of automobile 10.

Located inside the automobile is a driver 18 and a passenger 20. Located on seat 21 adjacent to passenger 20 is switch 22.

Switch 22 has electrically conductive wire 24 extending to brake control 26. Switch 22 also has electrically conductive wire 28 extending therefrom to engine control 30. Furthermore, switch 22 has extending therefrom electrically conductive wire 32 to emergency flasher light control 34.

Switch 22 has an open and closed position and is a conventional electrical switch well known to those in the art. Switch 22 may be energized by a conventional 12 volt automobile storage battery. All three electrically conductive wires 32, 28, and 24 are connected to switch 22. When switch 22 is closed, an electrical signal is sent from switch 22 through wires 24, 28 and 32 to brake control 26, engine control 30 and flasher control 34. Switch 22 can be closed by the passenger 20. When an electrical signal voltage is received by brake control 26, engine control 30, and emergency control flasher 34, by actuating switch 22 the brakes are applied to the automobile, the engine is stopped, and the emergency flasher warning lights are actuated. Thus, automobile 10 can be stopped and cars in the vicinity of automobile 10 are warned that a emergency situation exits.

Brake control 26 may be any conventional device for applying the brakes of a vehicle in response to an electrical signal. Brake control 30 may include an electric motor-driven pump actuated by switch 22 which pumps hydraulic brake fluid under sufficient pressure to actuate the brakes into the conventional hydraulic brake system used by most motor vehicles.

Engine control 30 may be any conventional device for stopping the engine of an automobile. Exemplary of such controls are the conventional ignition switch on an automobile. Engine control 30 preferably is an ignition switch which shuts off or interrupts the ignition system of an automobile. However, engine control 30 can be a fuel stopping or interrupting switch which stops the flow of fuel to the engine, particularly when the engine is a diesel engine having no ignition system.

The emergency flasher control 34 may be any device for actuating the emergency flasher or warning lights installed on all modern automobiles.

Emergency flasher or warning lights have been required on automobiles by law in most countries for many years. The emergency flasher lights 11 flash on the front and rear of an automobile to warn other vehicles of a stopped or slowly moving vehicle in an emergency or dangerous situation. Exemplary of such devices are the manually operated switches on the steering column of an automobile. A conventional electrical switch connected to the electrical circuitry of the emergency flasher lights and actuated by switch 22 may be utilized as a control 34.

Although the preferred embodiments of the present invention have been disclosed and described in detail above, it should be understood that the invention is in no sense limited thereby, and its scope is to be determined by that of the following claims:

What is claimed is:

1. A safety device for an automobile having an engine, brakes, and emergency flashing lights, said safety device comprising:
    a. electrically operated engine control means for stopping the engine of said automobile,
    b. electrically operated brake control means for applying the brakes of an automobile to stop said automobile,
    c. electrically operated emergency flasher control means for applying the emergency flashing lights of an automobile, and
    d. electrically operated switch means located in said automobile operable by a passenger in said automobile to simultaneously stop said automobile engine, apply aid brakes, and operate said emergency flashing lights.

2. The safety device of claim 1 wherein said engine control means has fuel interrupting means for interrupting fuel flow to the automobile engine when said switch is actuated.

3. The safety device of claim 1 wherein said engine control means has ignition interrupting means for stopping the ignition system of said engine.

* * * * *